(12) United States Patent
Lim et al.

(10) Patent No.: US 8,733,534 B2
(45) Date of Patent: May 27, 2014

(54) BELT CONVEYOR SYSTEM

(75) Inventors: Kok Leng Lim, Singapore (SG); Hee Kwee Sng, Singapore (SG)

(73) Assignee: Pteris Global Limited, Singapore (SG)

( * ) Notice: Subject to any disclaimer, the term of this patent is extended or adjusted under 35 U.S.C. 154(b) by 259 days.

(21) Appl. No.: 13/169,054

(22) Filed: Jun. 27, 2011

(65) Prior Publication Data

US 2011/0315514 A1 Dec. 29, 2011

Related U.S. Application Data

(60) Provisional application No. 61/358,941, filed on Jun. 28, 2010.

(51) Int. Cl.
*B65G 47/46* (2006.01)

(52) U.S. Cl.
USPC ............... 198/369.5; 198/861.6; 198/587

(58) Field of Classification Search
USPC ........... 198/369.1, 369.5, 861.6, 457.03, 587, 198/370.01, 370.1, 371.2, 435, 436, 833, 198/835
See application file for complete search history.

(56) References Cited

U.S. PATENT DOCUMENTS

| | | | | | |
|---|---|---|---|---|---|
| 509,386 | A | * | 11/1893 | Muller | 198/861.6 |
| 3,061,075 | A | * | 10/1962 | Wise | 198/861.6 |
| 3,982,625 | A | * | 9/1976 | Wentz et al. | 198/572 |
| 4,887,708 | A | * | 12/1989 | Brown et al. | 198/831 |
| 5,988,362 | A | * | 11/1999 | Nakamura et al. | 198/831 |
| 6,360,869 | B1 | * | 3/2002 | Itoh et al. | 198/370.1 |
| 6,958,452 | B2 | * | 10/2005 | Takahashi | 177/145 |
| 7,040,456 | B2 | * | 5/2006 | Ach et al. | 187/251 |
| 7,267,518 | B2 | * | 9/2007 | Kinzer | 414/272 |
| 2010/0181166 | A1 | | 7/2010 | Hishinuma | |

FOREIGN PATENT DOCUMENTS

| | | |
|---|---|---|
| JP | 60082524 | 5/1985 |
| JP | 2009029620 | * 2/2009 |
| WO | 2009001556 | 12/2008 |

* cited by examiner

*Primary Examiner* — James R Bidwell
(74) *Attorney, Agent, or Firm* — Horizon IP Pte. Ltd.

(57) ABSTRACT

A belt conveyor system with a distributing belt conveyor unit having upper and lower movable frame assemblies that are pivotally connected to a gear unit that simultaneously moves the lower movable frame assembly in opposition to the movement of the upper movable frame assembly, therein allowing the belt to track smoothly when transferring the articles between one branch belt conveyor unit and two or more branch belt conveyors units. The construction of the distributing belt conveyor unit allows for easy removal of the belt.

21 Claims, 12 Drawing Sheets

BELT CONVEYOR SYSTEM

CROSS-REFERENCE TO RELATED APPLICATION

This application claims priority to U.S. Provisional Application No. 61/358,941, filed Jun. 28, 2010. The entire contents of this related application is incorporated herein by reference in its entirety.

BACKGROUND

Belt conveyor systems, such as those used in airports to handle baggage or parcels and in industrial facilities to move products, typically include a "junction" for distributing or sorting the articles being transported from one conveyor to another. The distributing and/or sorting may be accomplished using diverters that have arms that are pivotably mounted at the side or adjacent to the conveyor to move articles to branch conveyors. Alternatively, the system may use a moveable conveyor for distributing or diverting the articles being transported onto stationary conveyors.

Conventional distributing conveyors are mechanically complex with many components that are subject to wear and tear. In addition, to increase the throughput of the articles, it is desirable to have the belt conveyor system operate at high speeds. However, the faster the conveyors are operated, the greater the equipment vibrates, further increasing the wear and tear, and also producing higher noise levels during operation. Moreover, belt conveyor systems typically require tension adjustments and belt replacement over time. In order to adjust and replace the belts, the belt conveyor system has to be disassembled, and if complex, this results in a long system shutdown period for such maintenance and service.

Accordingly, there is a need for belt conveyor systems with units that have fewer components, are capable of operating at high speeds relatively quietly, while allowing for ease of maintenance; in particular, the replacement of the belt.

SUMMARY

The embodiments generally relate to a belt conveyor system that includes a distributing belt conveyor having a belt, an upper movable frame assembly, a lower movable frame assembly, a base frame, a gear unit attached to the base frame, at least one drive motor, and the upper and lower movable frame assemblies are pivotally connected to the gear unit and have pulleys that support the movement of the belt. The upper movable frame assembly is moved to pre-determined positions corresponding to the positions of the two or more stationary belt conveyor of the system. The gear unit operates to simultaneously move the lower movable frame assembly in opposition to the movement of the upper movable frame assembly, which permits the belt to track smoothly. The distributing belt conveyor can be operated bi-directionally, when transferring the articles between a trunk belt conveyor and the two or more branch belt conveyors.

In one embodiment, a belt for the belt conveyors that has edge protrusions on its upper surface is disclosed. The pulleys for the belt conveyors will have edge profiles that engage these protrusions.

A further embodiment of the belt conveyor system relates to the design and construction of the distributing belt conveyor that allows for easy removal of the belt, and in general, to a frame structure for belt conveyors that has removable sections to enable the belt to be more easily removed.

The embodiments, along with their advantages and features herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessary to scale, because the emphasis is generally being placed upon illustrating the principles of the invention. In the description below, various embodiments of the present invention are described with reference to the following drawings, in which.

DETAILED DESCRIPTION

The embodiments generally relate to a belt conveyor system. The belt conveyor system, called a Flexible Horizontal Conveyor, may be used in many applications, including, but not limited to, airport handling systems for baggage and parcels, industrial production lines for moving and sorting various articles, and other similar uses. The belt conveyor system will have multiple units, including a distributing belt conveyor, for directing the articles to and from multiple locations.

The distributing belt conveyor is able to perform several functions including: 1) be placed at a confluence of a transportation line to merge the articles into the transportation mainstream by being positioned at either the home position or divert position; 2) be placed at a confluence of a transportation line to divert the articles into the branch stream with assistance of other equipments (e.g. arm pusher) by being positioned at the divert position; 3) to sort the articles from the upstream, in-feed trunk conveyor into two or more downstream branch conveyors by switching between the home position and different divert positions, respectively; and 4) to merge articles from the two or more upstream branch conveyors into one main transportation stream.

The following description sets forth, without limitation, the various embodiments of the belt conveyor system and, in particular, the distributing belt conveyor, as shown in the accompanying figures.

Figure 1:
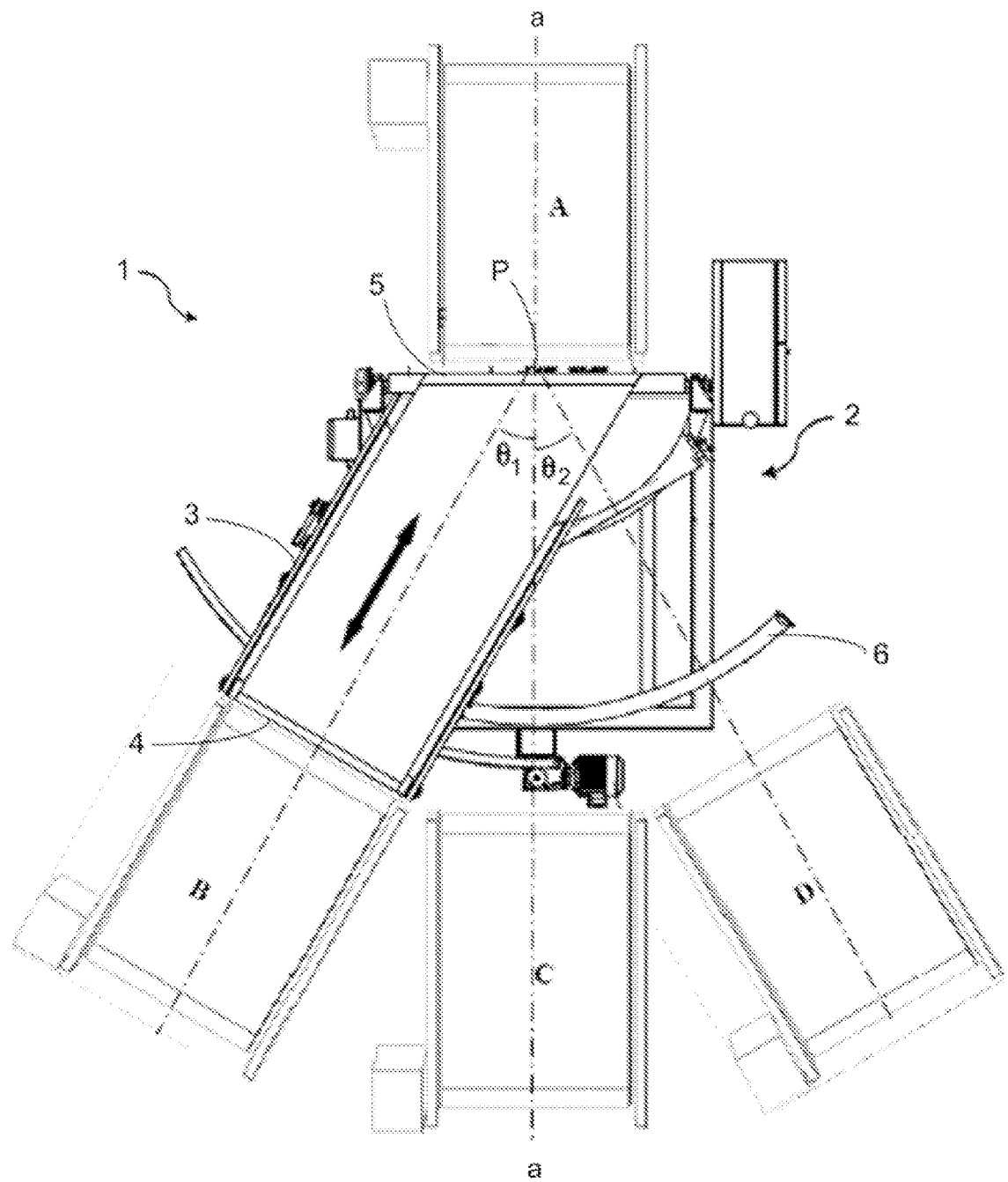
FIG. 1 is a plan view of an embodiment of a belt conveyor system.

As shown in FIG. 1, an embodiment of the belt conveyor system 1 includes a trunk stationary belt conveyor A, a distributing belt conveyor 2 and three branch stationary belt conveyors B, C and D. The belt conveyor system is able to move articles to and from multiple locations. Accordingly, the stationary belt conveyors A, B, C and D, as well as distributing belt conveyor 2, can be operated bi-directionally to transport the articles.

The distributing belt conveyor 2 employs a movable main conveyor assembly 3 with a movable end 4 and a stationary end 5, which are aligned, respectively, with the stationary belt conveyors. Located at the stationary end 5 is the pivot point P, which is the vertex for the angles $\theta_1$ and $\theta_2$ (as measured from the centerline a-a), for positioning the main conveyor assembly 3 in alignment with the two branch stationary belt conveyors B and D. The linear alignment along the centerline a-a with the stationary belt conveyor C is considered in a "neutral" or "home" position. The main conveyor assembly 3 operates by switching between the branch stationary belt conveyors, with the movable end 4 following an arc-shaped path about the pivot point P travelling along a roller guide 6. When three branch stationary belt conveyors are used, the angles $\theta_1$ and $\theta_2$ may be the same or different depending on the layout of the belt conveyor system 1. The angles may be pre-determined to permit automated positioning of the main conveyor assembly 3.

Figure 1A:
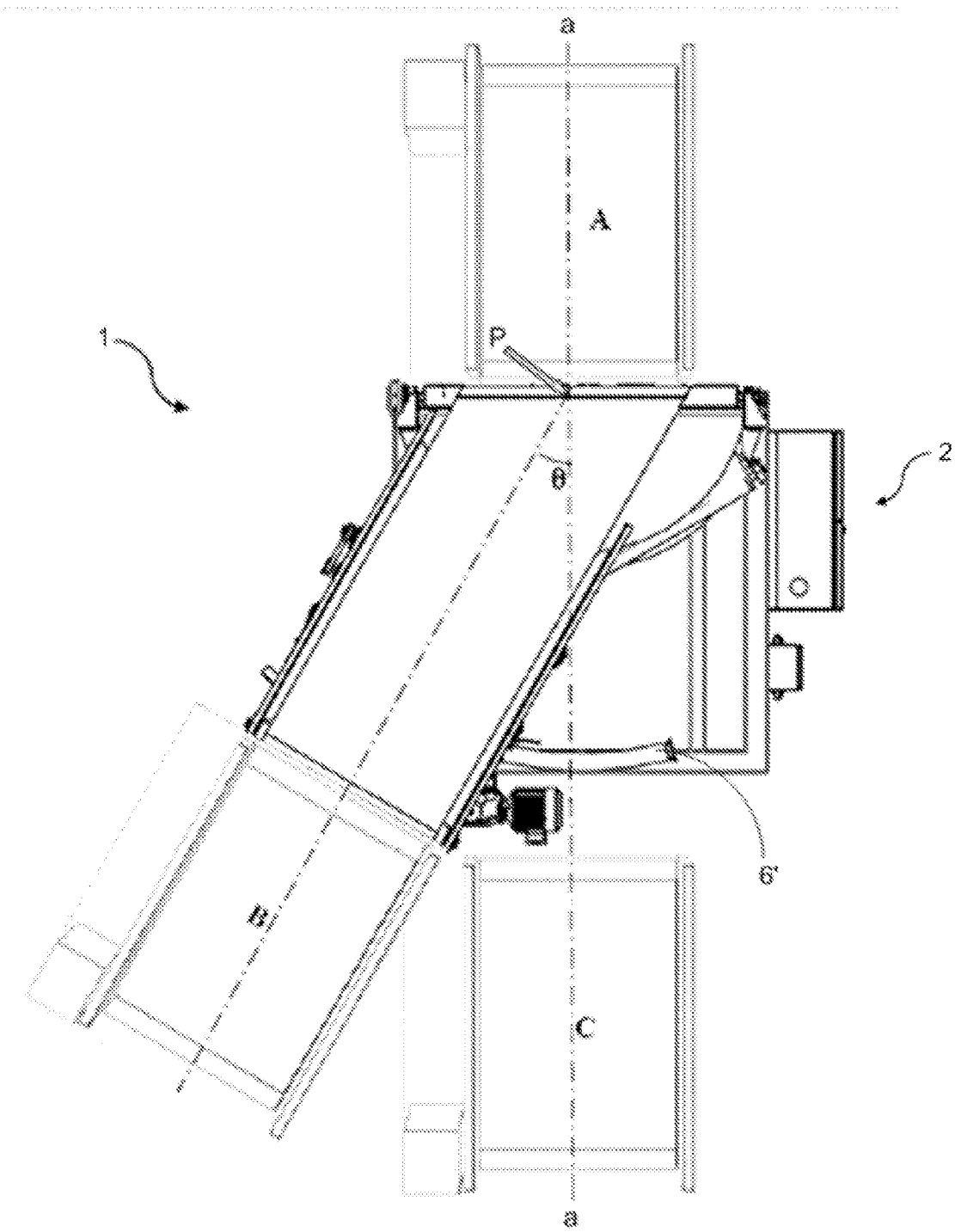
FIG. 1a is a plan view of another embodiment of a belt conveyor system.

In one embodiment, there are at least two branch stationary belt conveyors. FIG. 1a shows an embodiment of the belt conveyor system that is configured for only two branch stationary belt conveyors, B and C. In this configuration, the distributing conveyor unit may be modified; for example, the roller guide 6' can be shorter. It is within the scope of this disclosure to have more than three branch stationary belt conveyors, depending on the width of the main conveyor assembly and the width of the branch stationary belt conveyors.

Figure 2:
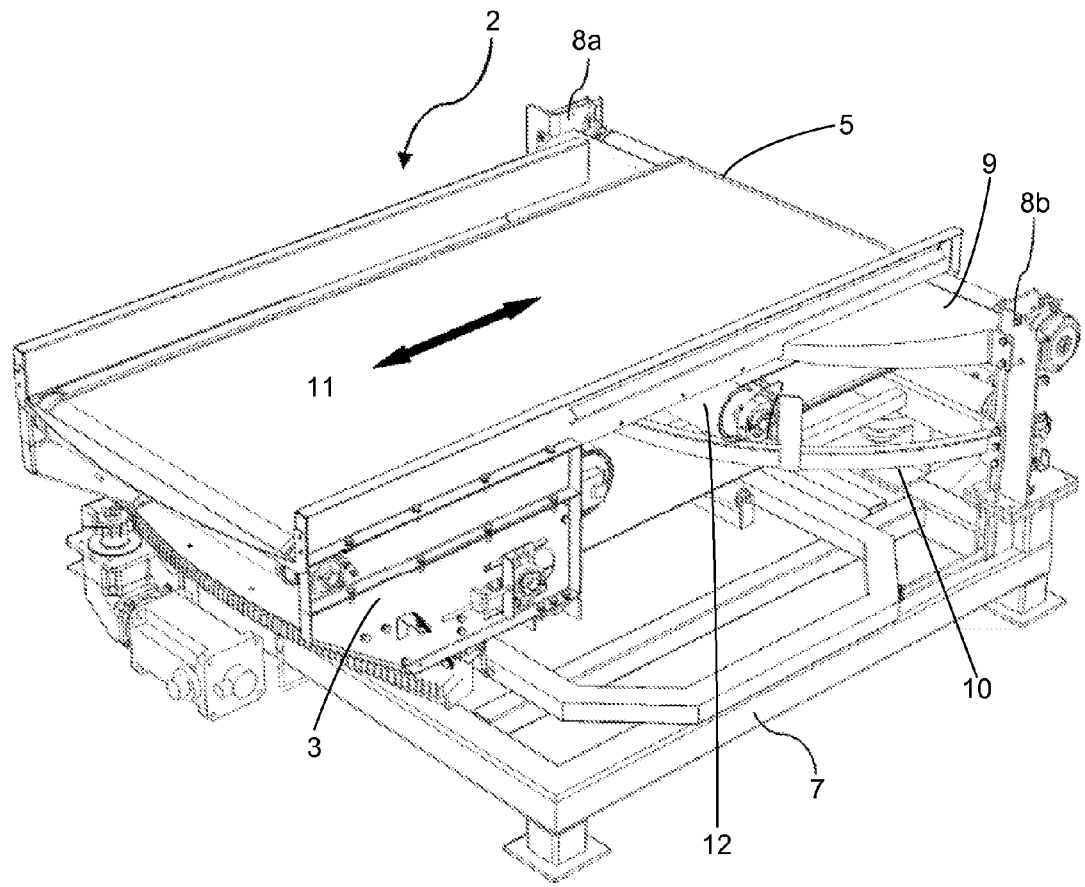
FIG. 2 is a perspective view of an embodiment of a distributing belt conveyor.

As shown in FIG. 2, this embodiment of the distributing belt conveyor 2 includes the movable main conveyor assembly 3 and a movable counter assembly 12, which are supported by a base frame 7. The main conveyor assembly moves in opposition to the movement of the counter assembly, which enables a belt 11 to track smoothly. The belt 11, for example, may include an endless belt, a lacing belt or a zip belt. Other types of belt may also be used. The main conveyor assembly and the counter assembly are shown in an aligned neutral position. The base frame 7 has vertical frames 8a and 8b at the stationary end 5. The base frame is wider than the main conveyor assembly to provide greater stability, and together with the vertical frames, is the main support for the distributing belt conveyor unit 2.

In a preferred embodiment, a horizontal frame 9 is shown in FIG. 2 as an arc-shaped, semi-circular structure. The vertical frames 8a and 8b support the horizontal frame 9, which is attached proximally to the tops of the vertical frames. The horizontal frame provides support at the stationary end 5 for the main conveyor assembly 3 and for the belt 11. The arc-shape may be correspondingly fitted to slidably engage the main conveyor assembly. It is within the scope of this disclosure to have alternative embodiments for the semi-circular, solid surface shown for horizontal frame 9; for example, the surface may be slats, a lattice or a mesh surface in place of a solid surface, and an arc-shape smaller than a semi-circle or other suitable shape may be used.

A guide track 10 is shown in FIG. 2 as an arc-shaped, semi-circular structure. The guide track supports the movement of the counter assembly 12. The vertical frames 8a and 8b also support the guide track 10, which is attached below the horizontal support 9. The shape of the guide track 10 can be varied, provided it is able to support the movement of the counter assembly, and will depend, in part, on the length of the counter assembly. It is preferred that at least that portion of the guide track 10 supporting the movement of the counter assembly 12 be an arc-shape.

Figure 3:
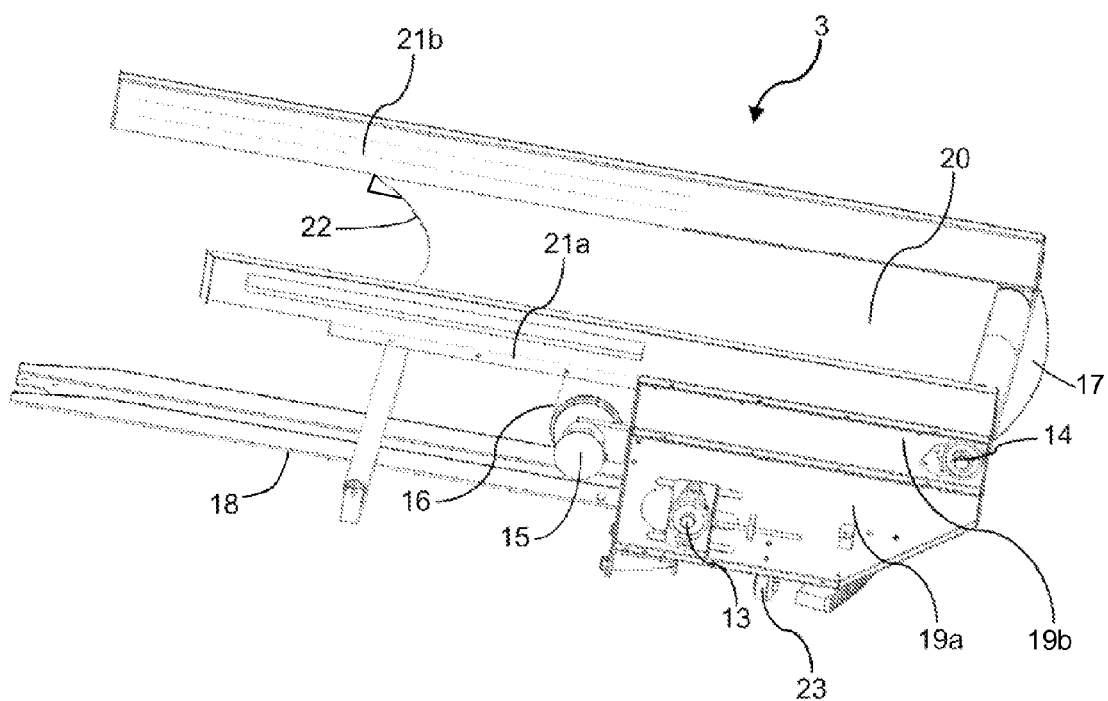
FIG. 3 is a perspective view of an exemplary main conveyor assembly of the distributing belt conveyor.

As shown FIG. 3, the main conveyor assembly 3 includes a take-up pulley 13, a tail pulley 14, and a drive pulley 16. The take-up pulley, tail pulley and drive pulley are axially mounted parallel to each other on the frame of the main conveyor assembly. The take-up pulley is adjustably mounted to allow for tightening and loosening of a belt and can be removed when the belt needs to be replaced. Located near the tail pulley 14 is an extension 17, which serves to bridge the gap between the distributing belt conveyor and the branch stationary belt conveyors.

In the embodiment shown in FIG. 3, a belt drive motor 15 is attached to the drive pulley 16 and is a drum-type motor. It is within the scope of this disclosure for the drive pulley to be motorized by either a direct method, using a drum motor or shaft mounted motor, or an indirect method, using a timing belt coupled with switching drive motor that is horizontally mounted on the main conveyor assembly 3.

The main conveyor assembly 3 includes a main frame connector 18 and at least one caster wheel 23 that is attached to the underside of the main conveyor assembly. The caster wheel travels on the roller track 6, as it supports the weight of main conveyor assembly during the switching movement about pivot point P. The upper surface of roller track 6 is preferably rubberized for noise reduction. The main conveyor assembly 3 is also provided with two side frames that are removable for maintenance, including the replacement of the belt. In one preferred embodiment, each side frame is divided into two removable parts 19a and 19b, which permits the take-up pulley 13 or the tail pulley 14 to individually serviced without the need to disturb the other pulley.

The upper portion of the main conveyor assembly 3 is provided with a horizontal belt support 20 and side guards 21a and 21b. The horizontal belt support and side guards accommodate the contour of the horizontal frame 9 to allow the main conveyor assembly to move smoothly. It is also preferred that the upper surfaces of the horizontal belt support 20 and the horizontal frame 9 are leveled to be in the same horizontal plane, thereby permitting the transported articles to travel smoothly on the belt, and that edge 22 of horizontal belt support is shaped to correspond closely with the horizontal frame 9. Alternative embodiments for the horizontal belt support 20 may include a frame with rollers, slats, a lattice or mesh surface rather than a solid surface.

The side guards 21a and 21b are positioned to move over the horizontal frame 9 with minimal or no friction. In addition, the lengths of the side guards can be the same or different depending on the number of branch stationary belt conveyors. For example, if only two branch stationary belt conveyors are present, and positioned as B and C as shown in FIG. 1a, it can be advantageous to have side guard 21b longer than side guard 21a. However, if the two branch stationary belt conveyors are positioned as C and D, as shown in FIG. 1, it can be advantageous to have side guard 21a longer than side guard 21b.

Figure 4:
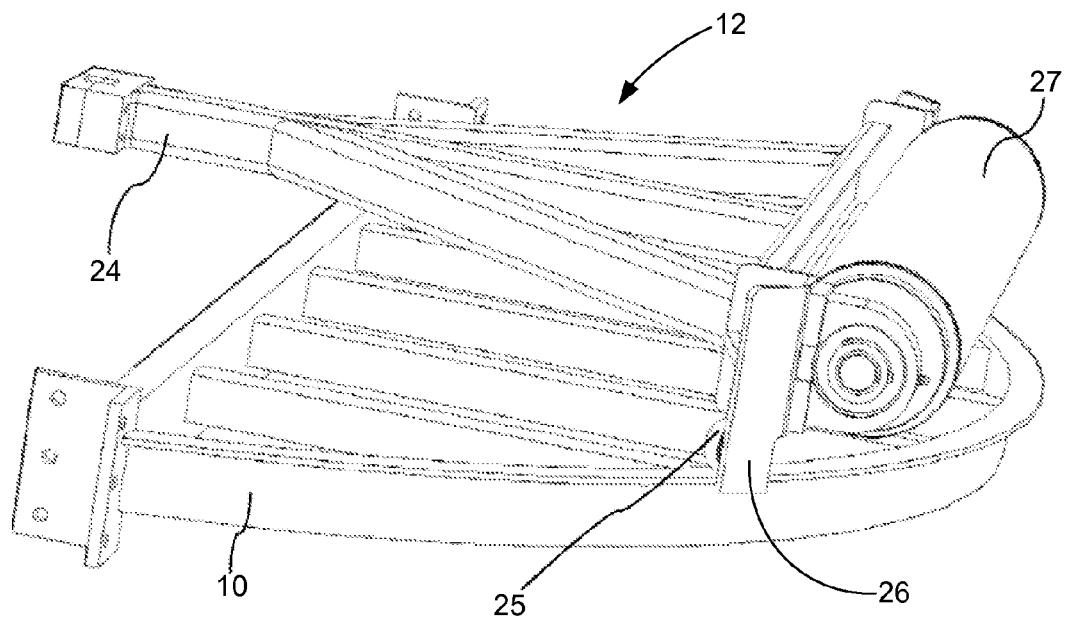
FIG. 4 is a perspective view of an exemplary counter assembly of the distributing belt conveyor.

As shown in FIG. 4, the counter assembly 12 is provided with a counter frame connector 24, bearing wheel 25, wheel support 26 and counter pulley 27. The counter assembly is supported by at least one bearing wheel, which moves on guide track 10. When one bearing wheel is used, the bearing wheel and wheel support is preferably located near the center of the counter pulley (not shown) to provide better weight distribution. In a preferred embodiment having two wheel supports positioned on the sides of the counter pulley 27, the counter assembly 12 will have at least two bearing wheels. It is preferred that the bearing wheels 25 be made of a polymeric material, which will enable smooth movement on the guide track and reduced noise.

Figure 4A:
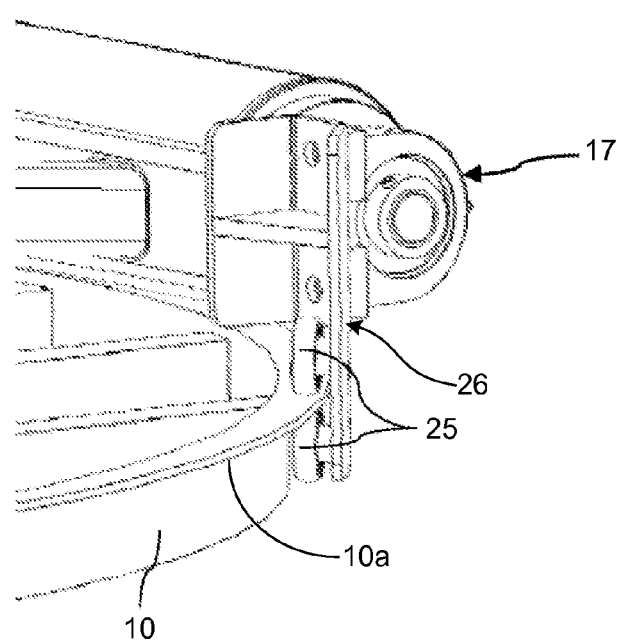
FIG. 4a is an exploded perspective view of a section of the counter assembly.

As shown in FIG. 4a, another preferred embodiment provides a wheel support 26 on both sides of the counter pulley 27, with each wheel support having upper bearing and lower bearing wheels 25. The guide track 10 is provided with a flange portion 10a that is engaged between the upper and lower bearing wheels. In this arrangement, the bearing wheels prevent the counter pulley from disengaging from the guide track.

Figure 5:
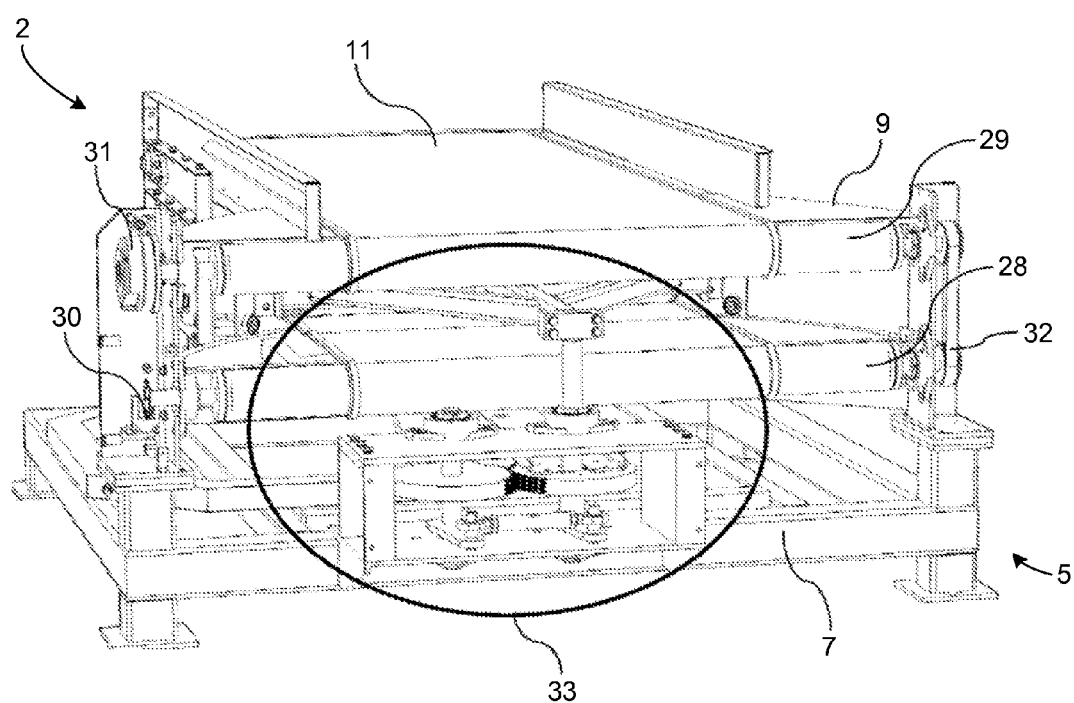
FIG. 5 is a perspective view of an exemplary switching gear unit of the distributing belt conveyor.

As shown in FIG. 5, the distributing belt conveyor 2 is provided with two long end pulleys, the lower long end pulley 28 and upper long end pulley 29, and a switching gear unit 33, which are positioned at the stationary end 5. The lower long end pulley 28 and upper long end pulley 29 are mounted parallel to each other. The long end pulleys 28 and 29 rotate when the main conveyor assembly is in the "home" position. When the main conveyor assembly is in a "diverted" position, as shown in FIG. 1, both long end pulleys are kept stationary to allow the belt to more easily stay on track. In one embodiment, to keep the long end pulleys stationary, an encoder 30 and brake mechanism 31 are provided at the ends of the long end pulleys, while the other ends of long end pulleys are coupled with a timing belt 32. The brake mechanism may be placed on either the upper or the lower long end pulley.

Figure 5A:
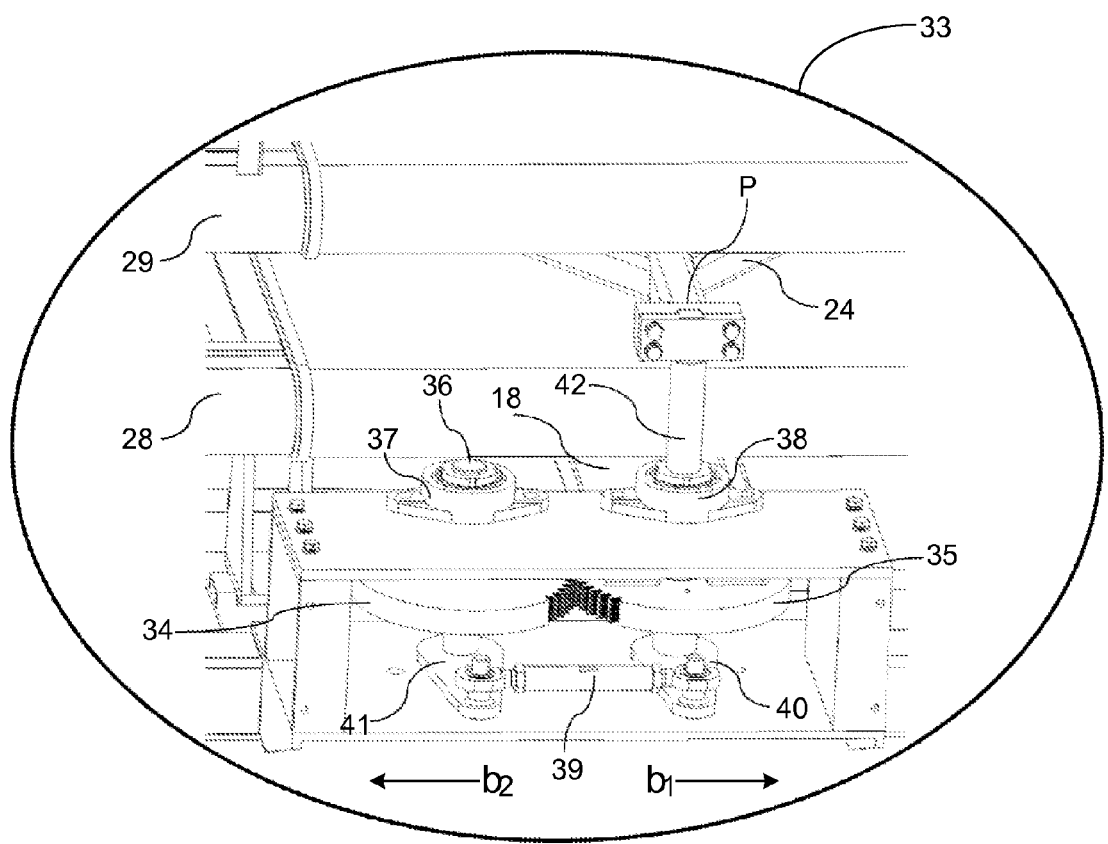
FIG. 5a is an exploded perspective view of the switching gear unit.

The movements of the main conveyor assembly 3 and the counter assembly 12 are synchronized using a switching gear unit 33, or "reverse" gear unit. As shown in FIG. 5a, the switching gear unit 33 is provided with a counter gear 34, a main gear 35, a counter shaft 36, four flanged mounted bearings (only the top flanged mounted bearings 37 and 38 are shown), at least one eye-turned buckle 39, two welded plates 40 and 41, and a main shaft 42, which embodies the pivot point P. The remaining two flanged mounted bearings are positioned at the underside of the switching gear unit 33 near the bottom ends of counter shaft 36 and main shaft 42.

The main frame connector 18 is coupled to main gear 35, which enables the synchronized movement. The main gear 35 has bearings (not shown) inside and these bearings permit rotation on the main shaft 42, i.e., each moves independently. The counter frame connector 24 is connected to the top end of the main shaft 24. The main shaft acts as the pivot point P for the movement of both the main conveyor assembly 3 and counter conveyor 12.

The main gear 35 and counter gear 34 are engaged and rotate in opposite directions. The welded plates 40 and 41 are joined by at least on eye-turned buckle 39 and this synchronizes the rotation of main shaft 42 and counter shaft 36. By means of the opposite rotation of the gears and the shaft synchronization, the reverse swinging movement of main conveyor assembly 3 and counter conveyor 12 is achieved.

For example, to align the movable end 4 of main conveyor assembly 3 with the branch stationary belt conveyor B (as shown in FIG. 1), the main frame connector 18 is moved in the direction $b_1$ (as shown in FIG. 5a). As a result, the main gear 35 (which is attached to main frame connector 18) is rotated in a clockwise direction and causes a counter-clockwise rotation of the counter gear 34 and counter shaft 36. Accordingly, the main shaft 42 and the attached counter assembly 12 are rotated in a counter-clockwise direction by the arrangement of the welded plates 40 and 41 and the eye-turned buckle 39. The synchronized reverse swinging movement of main conveyor assembly 3 and counter assembly 12 thereby enable the smooth movement of the belt 11.

For the distributing belt conveyor 2, the belt 11 extending from the upper long end pulley 29 to the tail pulley 14 is the transporting surface for the articles. In one direction of use, the belt is taken downward by the drive pulley 16 and around the take-up pulley 13 towards the lower long end pulley 28. From the lower long end pulley 28, the belt extends around the counter pulley 23, and continues upward to the upper long end pulley and then to the tail pulley 14.

Figure 6:
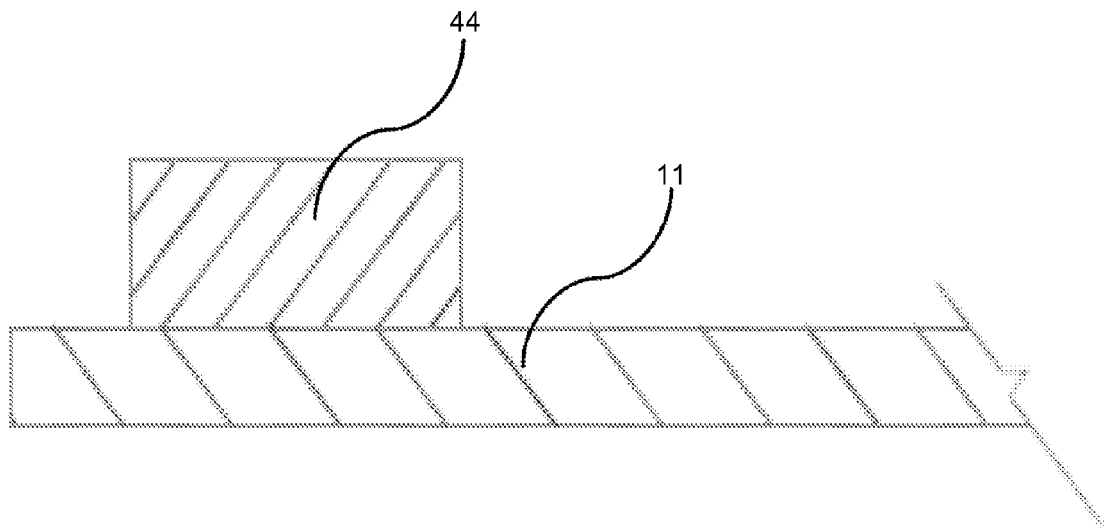
FIG. 6 is a cross sectional view of an exemplary protrusion for a belt.

In a preferred embodiment, the belt 11 is provided with protrusions that are proximal to the outer edges of the upper surface of the belt, which engage the drive and counter pulleys. As shown in FIG. 6, a protrusion 44, which is made of a medium hard belt material, is located proximal to the edge of the belt 11. In another preferred embodiment, the edge protrusion 44 of the belt has cross-sectional shape in the form of a rectangle. It is within the scope of this disclosure and understood that other shapes may be used, including square, semicircular and triangular. In addition, between the protrusions, a roughened upper surface may be used that prevents transported articles from easily sliding off the conveyor, while the lower surface of the belt is smooth.

Figure 7:
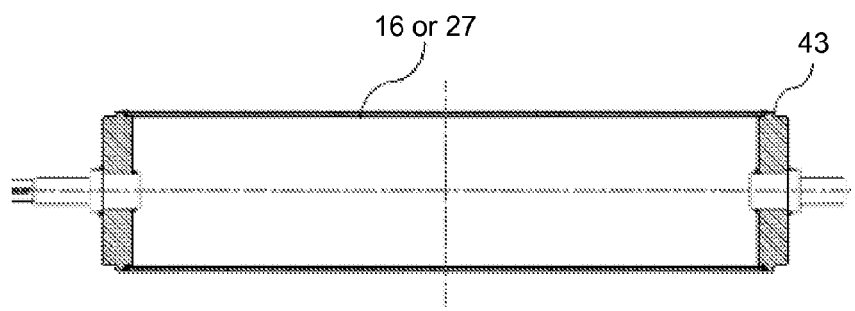
FIG. 7 is a cross sectional views of an exemplary grooved-step profile of the drive pulley and counter pulley.
Figure 7A:
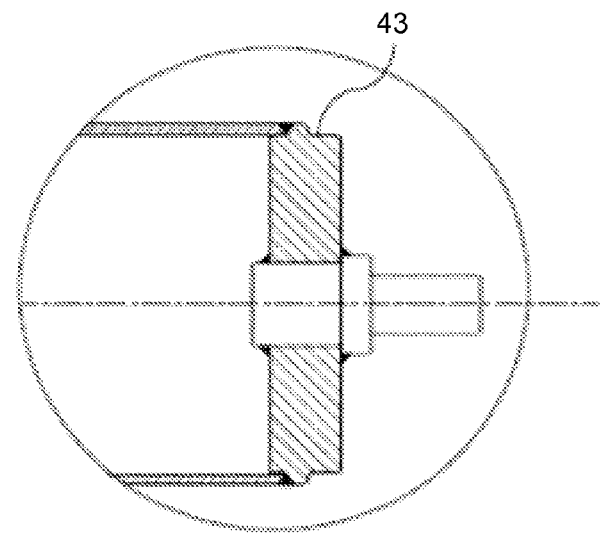
FIG. 7a is an exploded cross sectional view of the grooved-step profile.
Figure 7B:
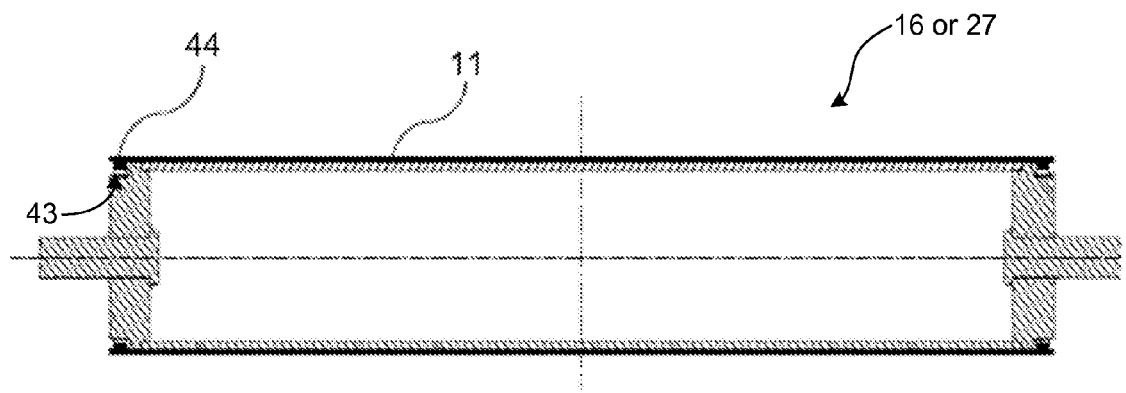
FIG. 7b is a cross sectional view of a belt with an exemplary protrusion engaging the grooved-step profile of a pulley.

As shown in FIGS. 7, 7a and 7b, in this preferred embodiment, the drive pulley 16 and counter pulley 27 are provided with ends that have a grooved-step profile 43. The shape of the groove 43 will correspond with the shape of the protrusion 44 to allow the protrusion to fit inside the grooved-step. This arrangement allows the drive and counter pulleys to more easily maintain the position of the belt and prevents the belt from sliding off the pulleys and to the edges of the conveyor. The corners of grooved-step profile 43 are made smooth to mitigate the tearing of the belt 11.

In one embodiment, the movement or "switching" between the branch stationary belt conveyors is powered by a motorized drive mechanism. The preferred embodiments for the drive mechanism are: a) belt drive mechanisms; and b) gear drive mechanisms.

Figure 8A:
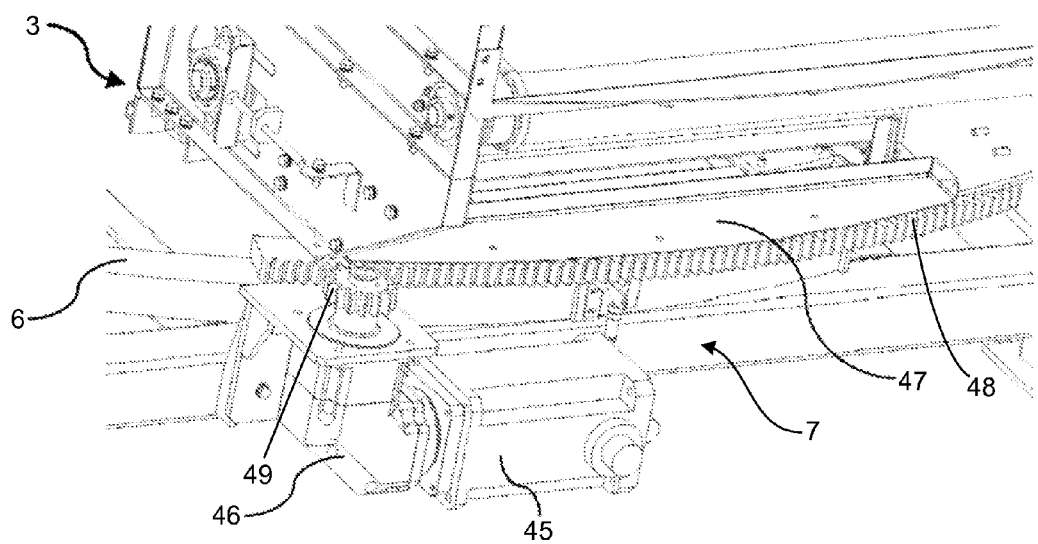
FIG. 8a is a perspective view of an exemplary gear drive mechanism for an embodiment of the distributing belt conveyor unit.

As shown in FIG. 8a, an embodiment of the gear drive mechanism provides a switching drive motor 45, a gearbox 46, arc gear 47 with arc sprockets 48, and a sprocket 49. Switching drive motor 45 is mounted on the base frame 7 under the main conveyor assembly 3. Gearbox 46 attached to switching drive motor 45 can be a right angle or straight type. Arc gear is preferably attached to the underside main conveyor assembly 3. The movement of main conveyor assembly 3 is driven by the operation of the switching drive motor 45 via sprocket 49, as it engages the arc sprocket 48 on the arc gear 47. In another embodiment, the arc gear may be substituted with pins or a chain to engage the sprocket 49.

Figure 8B:
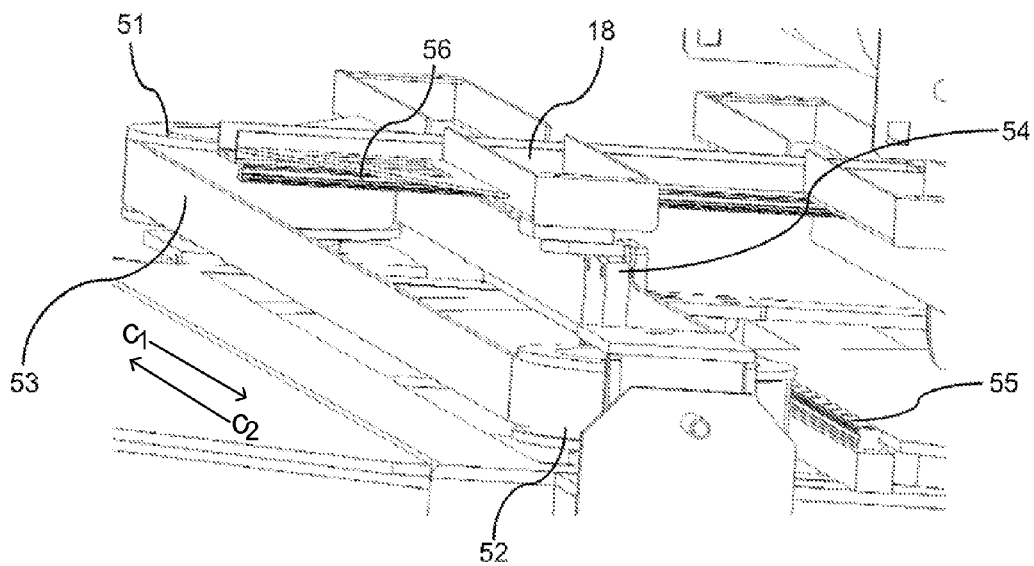
FIG. 8b is a perspective view of an exemplary belt drive mechanism for an embodiment of the distributing belt conveyor unit.

As shown in FIG. 8b, an embodiment of the belt drive mechanism provides a gearbox (not shown), switching drive motor (not shown), two drive pulleys 51 and 52, a timing belt 53, connection block 54 and two linear rails 55 and 56. As with the gear drive mechanism, the switching drive motor and gear box are mounted on the base frame 7. The gearbox attached to the switching drive motor can be a right angle or straight types. The two pulleys 51 and 52 are mounted at the upper surface of base frame 7 and either one of the pulleys may be connected to and driven by the switching drive motor and gearbox. The timing belt 53 is looped around the two pulleys 51 and 52, with the connection block 54 attached firmly on the timing belt 53. The linear rail 55 is mounted on the base frame 7 and is positioned parallel with the section of the timing belt 53 between the pulleys. The linear rail 56 is attached under main conveyor assembly. The connection block 54 is slidably attached to linear rails 55 and 56. The motor 45 drives the movement of connection block 54 as a result of it being coupled to the timing belt 53.

When the pulley 51 or 52 (depending on which pulley is attached with the drive motor) is rotated in clockwise direction, the connection block 54 is driven in the direction $c_1$ by the movement of the timing belt 53. The linear guide rail 56 is pulled by connection block 54 and the main conveyor assembly 3 is swung in the same direction. When the pulley 51 or 52 is rotated in counter-clockwise direction, the main conveyor assembly 3 is swung to the direction $c_2$.

The embodiments provide a distributing belt conveyor unit that is simpler to maintain and service; in particular, the removal of the belt is simplified. To that end, with reference to FIGS. 9, 10 and 10a, it is preferred that the belt removal be performed from the side of the distributing belt conveyor where the timing belt 32 is located.

Figure 9:
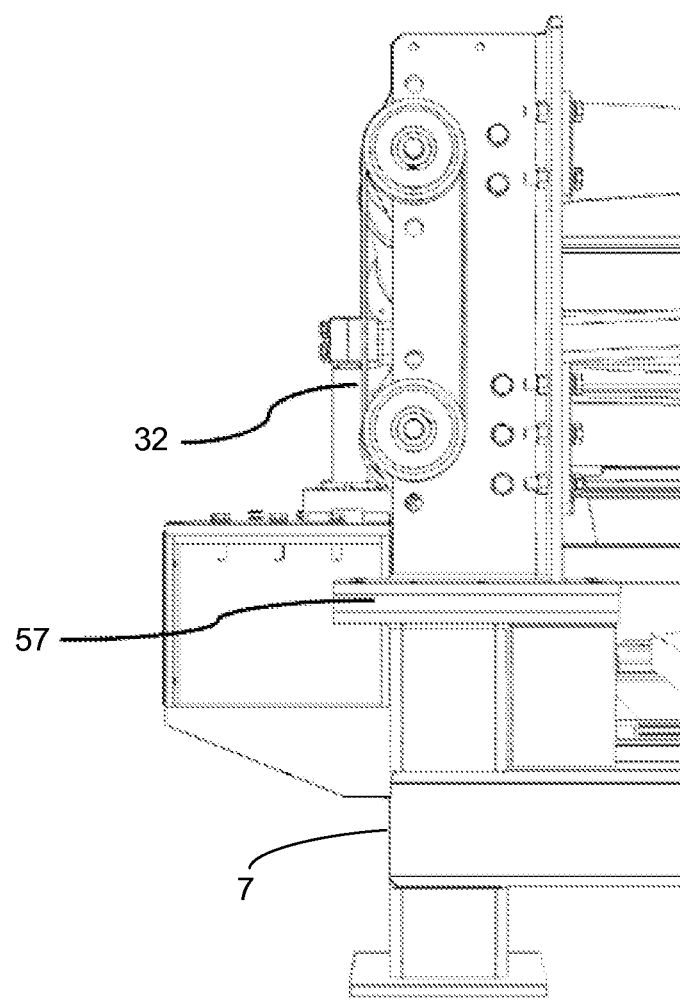
FIG. 9 is a perspective view of a section of an embodiment of the distributing belt conveyor unit showing the vertical frame, spacer and base frame arrangement.
Figure 10:
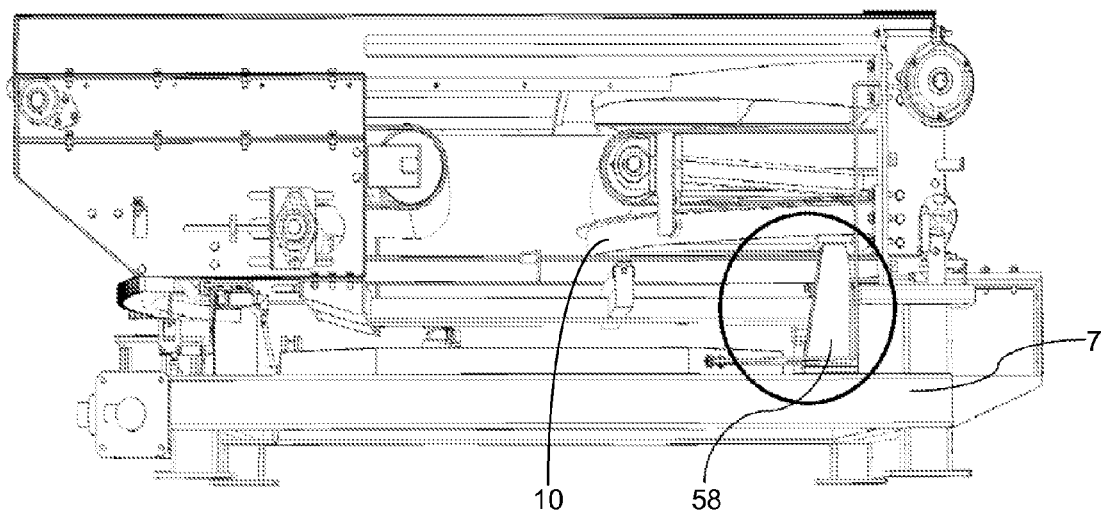
FIG. 10 is a perspective view showing the replacement position of an exemplary belt removal support.
Figure 10A:
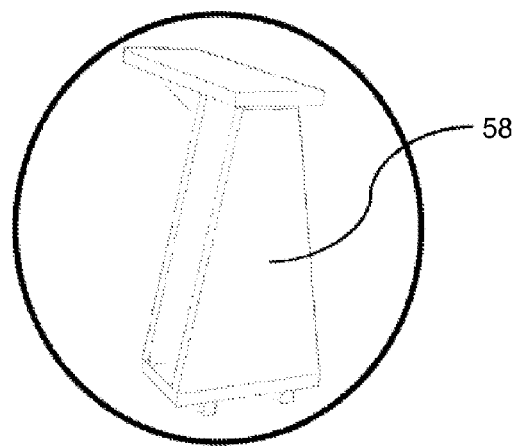
FIG. 10a is an exploded perspective view of the exemplary belt removal support.

To begin, the take-up pulley 13 is loosened and removed, followed by the removal of extension 17 and the main assembly side frames parts 19a and 19b. By removing the take-up pulley, the belt is slackened and the counter pulley 27 can be easily removed by unfastening the counter frame connector 24 from main shaft 42. Thereafter, the belt 11 can be shifted to the side where the timing belt 32 is located. The belt removal support 58, which has an inverted L-shape, as shown in FIG. 10a, is placed on the base frame 7 on the opposite side of the timing belt 32, as shown in FIG. 10. The belt removal support is positioned to permit the remaining pulleys to be left undisturbed in their original positions. Subsequently, the timing belt 32 and the vertical spacer 57, as shown in FIG. 9, are removed. After completing the steps above, the belt 11 can be removed through the openings created by the removal of the side frames parts 19a and 19b and the vertical spacer 57.

Although the one or more above-described embodiments and implementations have been described in language specific to structural features and/or methodological steps, it is to be understood that other embodiments and implementations may be practiced without the specific features or steps described. Rather, the specific features and steps are disclosed as preferred forms of one or more embodiment and implementation.

What is claimed is:
1. A distributing belt conveyor of a belt conveyor system comprising:
   a belt;
   an upper movable frame;
   a lower movable frame;
   a base frame;
   a gear unit attached to the base frame, wherein the gear unit comprises a rotatable main gear engaging a rotatable counter gear that enables the movement of the upper and lower movable frames in opposite directions;
   at least one drive motor; and
   upper and lower movable frame supporting pulleys that enable movement of the belt and both movable frames are pivotally connected to the gear unit, wherein the gear unit enables, via the pivotal connections, the upper movable frame and the lower movable frame to move in opposition to each other.

2. The distributing belt conveyor of the belt conveyor system according to claim 1, wherein the drive motor is connected to the upper movable frame and the operation of the drive motor moves the upper movable frame to pre-determined positions.

3. The distributing belt conveyor of the belt conveyor system according to claim 2, wherein the drive motor is connected to the upper movable frame using a gear drive mechanism.

4. The distributing belt conveyor of the belt conveyor system according to claim 2, wherein the drive motor is connected to the upper movable frame using a belt drive mechanism.

5. The distributing belt conveyor of the belt conveyor system according to claim 1, wherein the upper movable frame comprises a movable belt support surface that is shaped to slidably correspond with a fixed belt support surface attached to the base frame.

6. The distributing belt conveyor of the belt conveyor system according to claim 1, wherein the upper movable frame has at least one wheel that enables the movement of the upper movable frame.

7. The distributing belt conveyor of the belt conveyor system according to claim 6, wherein the wheel of the upper movable frame moves on an arc-shaped track attached to the base frame.

8. The distributing belt conveyor of the belt conveyor system according to claim 1, wherein the lower movable frame comprises at least one vertical support arm having at least one wheel that enables the movement of the lower movable frame.

9. The distributing belt conveyor of the belt conveyor system according to claim 8, wherein the at least one wheel comprises an upper wheel and a lower wheel that guide the movement of the lower movable frame along an arc-shaped track attached to the base frame.

10. The distributing belt conveyor of the belt conveyor system according to claim 1, wherein the base frame comprises at least one long pulley that is rotationally lockable in place.

11. The distributing belt conveyor of the belt conveyor system according to claim 1, wherein the base frame comprises upper and lower long pulleys that are rotationally lockable in place using a mechanical brake unit.

12. The distributing belt conveyor of the belt conveyor system according to claim 1, wherein the belt has an upper surface with two side edges and has protrusions adjacent both side edges.

13. The distributing belt conveyor of the belt conveyor system according to claim 12, wherein the pulleys comprise at least a first pulley on the upper movable frame and at least a second pulley on the lower movable frame having two end profiles that engage the protrusions of the belt.

14. The distributing belt conveyor of the belt conveyor system according to claim 3, wherein the gear drive mechanism comprises a switching drive motor, a gearbox, an arc gear with arc sprocket and a sprocket.

15. The distributing belt conveyor of the belt conveyor system according to claim 1, wherein the gear unit further comprises:
- a main shaft that supports the main gear and upon which the main gear is able to freely rotate;
- a counter shaft that supports the counter gear; and
- a connection mechanism that synchronizes the rotational movements of main shaft and the counter shaft,
- wherein the lower movable frame is connected to the main shaft and the upper movable frame is connected to the main gear.

16. The distributing belt conveyor of the belt conveyor system according to claim 1, wherein the distributing belt conveyor is positioned between a trunk stationary belt conveyor unit and at least two branch stationary belt conveyor units and the upper movable frame alignably moves to allow articles to and fro between the trunk and branch stationary belt conveyor units of the system.

17. The distributing belt conveyor of the belt conveyor system according to claim 14, wherein:
- the switching drive motor is mounted on the base frame;
- the gearbox is attached to the switching drive motor;
- the arc gear is disposed under the upper movable frame; and
- movement of the upper movable frame is driven by operation of the switching drive motor via the sprocket which engages the arc sprocket on the arc gear.

18. The distributing belt conveyor of the belt conveyor system according to claim 4, wherein the belt drive mechanism comprises a gearbox, a switching drive motor, first and second drive pulleys, a timing belt, a connection block and first and second linear rails.

19. The distributing belt conveyor of the belt conveyor system according to claim 18, wherein:
- the gearbox is attached to the switching drive motor and the gearbox and the switching drive motor are mounted on the base frame;
- the first and second pulleys are mounted on the base frame and one of the first and second pulleys is connected to and driven by the switching drive motor and gearbox;
- the timing belt is looped around the first and second drive pulleys with the connection block attached on the timing belt;
- the first linear rail is mounted on the base frame and is positioned parallel with section of the timing belt between the pulleys; and
- the second linear rail is attached under the upper movable frame, wherein the connection block is slidably attached to the first and second linear rails.

20. A belt conveyor system for moving articles to and fro between multiple end-points comprising:
- at least three branch stationary belt conveyor units and at least one distributing belt conveyor unit;
- the distributing belt conveyor unit comprising
  - a belt that is in stationary alignment with one stationary belt conveyor unit at one end and that is movable into switchable alignment at the other end with at least two of the at least three branch stationary belt conveyor units,
  - a base frame,
  - an upper movable frame,
  - a lower movable frame,
  - pulleys that support movement of the belt,
  - a gear unit having a main shaft, wherein the gear unit comprises a rotatable main gear engaging a rotatable counter gear that enables the movement of the upper and lower movable frames in opposite directions, and
  - at least one drive motor,
  - wherein the gear unit synchronizes the pivoting movement of the upper movable frame and lower movable frame about the main shaft in opposite directions.

21. A distributing belt conveyor of a belt conveyor system comprising:
- a belt;
- an upper movable frame;
- a lower movable frame;
- a base frame;
- a gear unit attached to the base frame, wherein the gear unit comprises a main shaft;
- at least one drive motor; and
- upper and lower movable frame supporting pulleys that enable movement of the belt,
- wherein both movable frames are pivotally connected to the main shaft of the gear unit, the main shaft of the gear unit serves as a pivot point for movement of both movable frames and the gear unit enables the upper and lower movable frames to pivot in opposite directions.

* * * * *